(12) United States Patent
Kim et al.

(10) Patent No.: US 9,942,512 B2
(45) Date of Patent: Apr. 10, 2018

(54) DISPLAY APPARATUS AND CONTROL METHOD THEREOF

(71) Applicant: SAMSUNG ELECTRONICS CO., LTD., Suwon-si (KR)

(72) Inventors: Jung-keun Kim, Hwaseong-si (KR); Seo-ye Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/292,877

(22) Filed: Oct. 13, 2016

(65) Prior Publication Data

US 2017/0118443 A1 Apr. 27, 2017

(30) Foreign Application Priority Data

Oct. 23, 2015 (KR) .......................... 10-2015-0148301

(51) Int. Cl.
| | |
|---|---|
| *H04N 7/00* | (2011.01) |
| *H04N 11/00* | (2006.01) |
| *H04N 7/01* | (2006.01) |
| *H04N 5/44* | (2011.01) |

(52) U.S. Cl.
CPC ......... *H04N 7/0127* (2013.01); *H04N 5/4403* (2013.01)

(58) Field of Classification Search
CPC .......... H04N 7/0127; H04N 7/01; H04N 5/44; H04N 5/4403
USPC ........................................ 348/552, 725, 734
See application file for complete search history.

(56) References Cited

U.S. PATENT DOCUMENTS

| | | | |
|---|---|---|---|
| 5,848,218 A | 12/1998 | Lee | |
| 8,180,932 B2* | 5/2012 | Lee | ...................... H04L 25/0262 710/15 |
| 9,524,681 B2* | 12/2016 | Vasquez | ............... G09G 3/2096 |
| 9,575,917 B1* | 2/2017 | Zhu | ......................... G06F 13/385 |
| 9,612,990 B2* | 4/2017 | Yang | ..................... G06F 13/4068 |
| 2009/0153574 A1* | 6/2009 | Chou | ....................... G09G 5/003 345/531 |

(Continued)

FOREIGN PATENT DOCUMENTS

| | | |
|---|---|---|
| EP | 2355506 A1 | 8/2011 |
| KR | 10-2010-0036211 A | 4/2010 |

(Continued)

*Primary Examiner* — Trang U Tran
(74) *Attorney, Agent, or Firm* — Sughrue Mion, PLLC (57) ABSTRACT

A display apparatus displaying an image based on an image signal received from a source device is provided. The display apparatus includes a display, a display port interface to connect to the source device, a user input interface configured to receive a mode select command indicating one of a plurality of modes divided according to a vertical frequency ranges where the image is displayed, a first memory configured to store Display Port Configuration Data, a second memory configured to store Extended Display Identification Data, and a processor configured to transmit the EDID to the source device. In response to a mode select command being input, the processor controls vertical frequency information corresponding to a mode selected according to the mode select command to be stored in the DPCD and the DPCD storing the vertical frequency information instead of the EDID to the source device through the interface to be transmitted.

11 Claims, 4 Drawing Sheets

(56) References Cited

U.S. PATENT DOCUMENTS

2010/0080218 A1    4/2010  Kwa et al.

FOREIGN PATENT DOCUMENTS

| KR | 10-2011-0026668 A | 3/2011 |
| KR | 10-2011-0091852 A | 8/2011 |
| KR | 10-2012-0098144 A | 9/2012 |

\* cited by examiner

| Display Port Address | Definition | Read/Write over AUX CH |
|---|---|---|
| 00601h-006FFh | RESERVED | Read all 0s |
| 00700h-007FFh | RESERVED for eDP | |
| Usage to be Defined | | |
| 00800h-00FFFh | RESERVED | Read all 0s |

~31

DISPLAY APPARATUS AND CONTROL METHOD THEREOF

CROSS-REFERENCE TO RELATED APPLICATION

This application claims priority from Korean Patent Application No. 10-2015-0148301, filed on Oct. 23, 2015, in the Korean Intellectual Property Office, the disclosure of which is incorporated herein by reference in its entirety.

BACKGROUND

Field

Apparatuses and methods consistent with exemplary embodiments relate to a display apparatus and a control method thereof, and more particularly, to a display apparatus displaying an image signal received from a source device through a display port (DP) and a control method thereof.

Description of Related Art

As a display apparatus has a large area and a high resolution, an interface for transmitting a signal between an image source and a display apparatus is required to have a high performance. In order to meet this requirement, a TV has been replaced with V×1, and an Information Technology (IT) product such as a notebook computer has been replaced with a display port (DP).

The DP is an interface determined by Video Electronics Standards Association (VESA), i.e., an interface type capable of integrating Low Voltage Differential Signaling (LVDS) that is an existing internal interface standard and a Digital Visual Interface (DVI) that is an external connection standard into one. The DP interface is technology capable of digitally performing an internal connection connecting a chip and a chip and an external connection connecting a product and a product. Two divided interfaces may be integrated into one to widen a data bandwidth so as to support a higher color depth and a higher resolution. The DP interface has a bandwidth 4 times or more than existing Digital Video Interactive (DVI) and a higher bandwidth than a High Definition Multimedia Interface (HDMI).

Due to the fast development of hardware such as a graphic card and the like, an updating period of a display apparatus such as a monitor does not match a rendering period of the graphic card. Therefore, there occurs a problem such as a tearing phenomenon where a screen appears to be cut, and the like. As a result, a freesync technology has emerged as a method for solving this problem.

The freesync is a technology for constantly smoothly providing a screen whose frame rate is changed like a high-performance game, by solving a problem occurring due to a difference between a frame and a screen play frequency. The freesync is capable of preventing a screen cutting phenomenon by synchronizing a scanning rate of the monitor with a frame rate of the graphic card.

The freesync technology realizes a frequency synchronization according to a method of setting a plurality of modes for a frequency range selectable by a user and producing Extended Display Identification Data (EDID) where frequency ranges are respectively set according to the plurality of modes so as to internally switch the EDID when selecting a mode through an On Screen Display (OSD) menu.

However, a display apparatus that complies with this existing freesync technology is required to store codes for each of the EDID according to the plurality of modes. Therefore, a large capacity is needed, and a production cost rises. Also, whenever a mode state is changed, a source device is to read each of the EDID again from the beginning, and thus a mute phenomenon where a screen becomes black occurs.

Therefore, there is a need for a method of easily changing a mode without a mute phenomenon.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Aspects of exemplary embodiments provide a display apparatus capable of improving a mute phenomenon of a displayed screen and a control method thereof.

According to an aspect of an exemplary embodiment, there is provided a display apparatus displaying an image based on an image signal received from a source device, the display apparatus including: a display configured to display the image based on the image signal; a display port (DP) interface configured to connect to the source device; a user input interface configured to receive a mode select command indicating one among a first mode corresponding to a first vertical frequency range where the image is displayed and a second mode corresponding to a second vertical frequency range where the image is displayed; a first memory configured to store Display Port Configuration Data (DPCD); a second memory configured to store Extended Display Identification Data (EDID) including information about a vertical frequency where the display apparatus operates; and a processor configured to transmit the EDID to the source device. In response to the mode select command being input, the processor is further configured to store vertical frequency information corresponding to a mode selected according to the mode select command in the DPCD and transmit the DPCD storing the vertical frequency information instead of the EDID to the source device through the DP interface.

The DP interface may include a main link, an auxiliary channel, and a Hot Plug Detect (HPD) line, and in response to the mode select command, the processor is further configured to transmit a HPD signal for notifying that the mode select command is input, to the source device through the HPD line and transmit the DPCD to the source device through the auxiliary channel.

The processor may be further configured to transmit the DPCD to the source device, receive the image signal having a frequency synchronized with the vertical frequency information included in the transmitted DPCD from the source device, and display the image.

The processor may be further configured to display an On Screen Display (OSD) menu for a mode select command on the display unit, and in response to a mode select command of one mode being input through the OSD menu, store vertical frequency information corresponding to a mode selected according to the input mode select command in the DPCD.

The processor may be further configured to transmit the HPD signal by using a short pulse.

According to an aspect of another exemplary embodiment, there is provided a method of controlling a display apparatus displaying an image based on an image signal received from a source device, the method including: receiving a mode select command indicating one among a first mode corresponding to a first vertical frequency range where the image is displayed and a second mode corresponding to a second vertical frequency range where the image is displayed; storing vertical frequency information corresponding to a mode selected according to the mode select command in Display Port Configuration Data (DPCD); and transmitting the DPCD storing the vertical frequency information corresponding to the selected mode instead of Extended Display Identification Data (EDID) to the source device through a display port (DP) interface.

The DP interface may include a main link, an auxiliary channel, and a Hot Plug Detect (HPD) line, and the transmitting may include: transmitting a HPD signal for notifying that the mode select command is input, to the source device; and transmitting the DPCD to the source device through the auxiliary channel.

The method may further include: receiving the image signal having a frequency synchronized with the vertical frequency information included in the transmitted DPCD from the source device; and displaying the image.

The storing may include displaying an On Screen Display (OSD) menu for a mode select command and, in response to a mode select command of one mode being input through the OSD menu, storing vertical frequency information corresponding to a mode selected according to the input mode select command in the DPCD.

The HPD signal may be transmitted by using a short pulse.

According to an aspect of yet another exemplary embodiment, there is provided a non-transitory computer readable recording medium having embodied thereon a program, which when executed by a processor of a display apparatus causes the display apparatus to execute a method of controlling a display apparatus displaying an image based on an image signal received from a source device, the method including: receiving a mode select command indicating one among a first mode corresponding to a first vertical frequency range where the image is displayed and a second mode corresponding to a second vertical frequency range where the image is displayed; storing vertical frequency information corresponding to a mode selected according to the mode select command in Display Port Configuration Data (DPCD); and transmitting the DPCD storing the vertical frequency information corresponding to the selected mode instead of Extended Display Identification Data (EDID) to the source device through a display port (DP) interface.

According to various exemplary embodiments as described above, a mute phenomenon and a flicker phenomenon of a displayed screen may be improved, and a mode may be a little more easily changed.

Additional and/or other aspects and advantages will be set forth in part in the description which follows and, in part, will be obvious from the description, or may be learned by practice of the exemplary embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail because they would obscure the disclosure with unnecessary detail.

Exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail because they would obscure the disclosure with unnecessary detail.

Hereinafter, exemplary embodiments will be described in detail with reference to the attached drawings.

Figure 1:
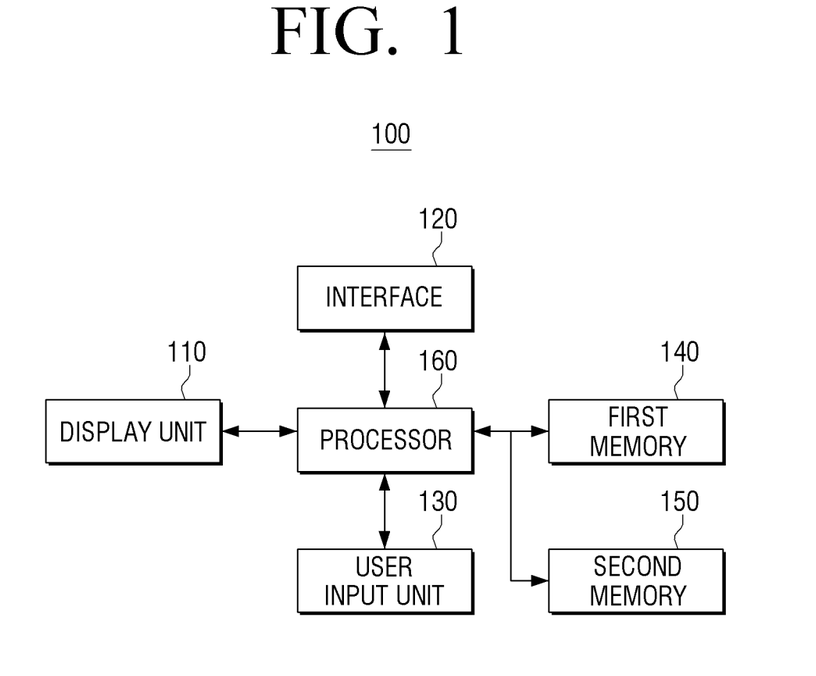
FIG. 1 is a block diagram of a simple configuration of a display apparatus according to an exemplary embodiment.

FIG. 1 is a block diagram of a simple configuration of a display apparatus 100 according to an exemplary embodiment.

Referring to FIG. 1, the display apparatus 100 according to the exemplary embodiment includes a display unit 110, an interface 120, a user input unit 130, a first memory 140, a second memory 150, and a processor 160.

The display unit 110 is an element that displays an image signal. The display unit 110 may include various types of displays capable of displaying an image like a Cathode Ray Tube (CRT), a Liquid Crystal Display (LCD), a Light Emitting Diode (LED), a Plasma Display Panel (PDP), and the like.

The interface 120 is an element that receives an image signal from a source device 200. In detail, the interface 120 is implemented as a display port (DP) to connect the display apparatus 100 and the source device 200 to each other. The DP has a maximum bandwidth of 10.8 Gbps that is two times or more than existing Digital Video Interactive (DVI) (a maximum of 4, 95 Gbps) and may simultaneously transmit 6 streams (3 of 1080p) of a maximum of 1080i through one connection by supporting a multiple stream with a Micro-Packet architecture.

A link of the DP may include a main link, an auxiliary channel, and a Hot Plug Detect (HPD) signal line.

The main link is a main transmission channel of stream data, i.e., corresponds to a one-way high-speed channel for an isochronous stream transmission.

Also, the auxiliary channel may be used as a half-duplex two-way channel to manage a link and control a device. Also, the auxiliary channel may be used as a high-speed two-way bus capable of transmitting data to other devices at a high speed after managing the link and controlling the device.

In addition, the HPD signal line is used to check whether the source device 200 and the display apparatus 100 are connected to each other and may output a Hot Plug Detect Signal (HPDS) to the source device 200.

When the source device 200 and the display apparatus 100 are first connected to each other, the source device 200 may perform a link training process of receiving the HPDS from the display apparatus 100 and optimizing links to transmit a stream. When the link training process is completed, stream data may be transmitted from the source device 200 to the display apparatus 100.

A more detailed description of this will be described later with reference to FIG. 2.

Also, exemplary embodiments are based on a freesync technology that synchronizes a vertical frequency of the display apparatus 100 with a frequency of an image input from the source device 200.

An existing vertical synchronization technology forcibly synchronizes a frame transmitted from a source device with an updating period of a display apparatus. Therefore, the freesync technology refers to a technology that, if a rate of a frame transmitted from a source device is lower than an updating period of a display apparatus or a much higher frame rate is rendered, variably changes and synchronizes the updating period of the display apparatus to solve a tearing phenomenon problem where a screen appears to be cut. The freesync technology uses an Adaptive Sync standardization technology included in a DP 1.2 standard of Video Electronics Standards Association (VESA).

According to the freesync technology, a user may select a vertical frequency, where a display apparatus operates, from an OSD menu displayed on the display unit 110 in a preset range through the user input unit 130. For example, the display apparatus may display an OSD menu for selecting one of a normal mode outputting an image within a range between 56 Hz and 75 Hz, a first mode outputting an image within a range between 40 Hz and 50 Hz, and a second mode outputting an image within a range between 50 Hz and 60 Hz according to a user command and may operate in a mode changed according to a select command of the user through the user input unit 130.

If the user selects a vertical frequency range where the display apparatus operates, a sync device may render and transmit an image in the vertical frequency range selected by the user, and the display apparatus may change a vertical frequency, where an image is output within a frequency range according to the selected mode, so as to enable the vertical frequency to synchronize with a frequency of a received image.

The user input unit 130 is an element that receives a mode select command of the user. In other words, the mode select command is a command to select a range of a vertical frequency value adjusted according to an image signal transmitted from the source device 200.

The user input unit 130 may be implemented as a button or the like that is physically included in the display apparatus 100. If the user presses a particular button of the user input unit 130, an OSD menu for selecting a mode may be displayed on a display unit. The displayed OSD menu may be implemented as a menu for selecting one of a normal mode outputting an image within a range between 56 Hz and 75 Hz, a first mode outputting an image within a range between 40 Hz and 50 Hz, and a second mode outputting an image within a range between 50 Hz and 60 Hz.

Therefore, the user may select a desired mode through the user input unit 130 so as to enable the display apparatus 100 to operate according to the selected mode.

The first memory 140 is an element that stores Display Port Configuration Data (DPCD). The DPCD includes a performance of a receiver and state information of a DP. For example, the DPCD may include information such as Scrambler Enable/Disable, DBC On/Off, Contents Protection Enable/Disable, and the like.

An environment of the DP is set according to the DPCD stored in the first memory 140 as described above, and thus the display apparatus 100 may be implemented as a DP type to normally display an image.

The second memory 150 is a memory that stores Extended Display Identification Data (EDID) of the display apparatus 100 and may be implemented as an Electrically Erasable Programmable Read Only Memory (EEPROM). A display apparatus that realizes an existing freesync function individually stores EDID including frequency information corresponding to each mode in the EEPROM and switch EDID stored in a memory according to a mode selected from an OSD menu. However, the display apparatus 100 according to an exemplary embodiment may store only one EDID having a frequency range (corresponding to a normal mode), where the display apparatus 100 basically operates, in the second memory 150.

According to an exemplary embodiment, vertical frequency information corresponding to a mode selected by a user from vertical frequency information respectively corresponding to a plurality of modes is stored in an area of the DPCD of the first memory 140 that may be defined by the user. The display apparatus 100 may store vertical frequency information corresponding to a mode selected by the user according to a mode select command of the user in a user definition area of the DPCD and transmit the DPCD to the source device 200 to perform synchronization. Therefore, the display apparatus 100 does not need to individually store EDID information in the EEPROM according to each mode, and thus a problem where a large capacity is needed due to a code size according to each EDID may be improved.

Also, each EDID information stored in the EEPROM may be read whenever a mode is changed, so as to prevent a mute phenomenon.

A detailed description of this will be described later with reference to FIG. 3.

The processor 160 is an element that controls an overall operation of the display apparatus 100.

The processor 160 may control to transmit the DPCD to the source device 200 through the interface 120.

In detail, the processor 160 controls to transmit the EDID stored in the EEPROM to the source device 200 so as to output an image according to a vertical frequency corresponding to a normal mode included in the EDID before a mode select command is input. If the mode select command is input, the processor 160 may control to transmit the DPCD including vertical frequency information corresponding to a mode selected according to the input mode select mode to the source device 200 so as to output an image according to a vertical frequency corresponding to a mode included in the DPCD.

In this case, the source device 200 may transmit an image having a frame rate synchronizing with vertical frequency information selected in the display apparatus 100 to the display apparatus 100 by rendering an image to be input into the display apparatus 100 according to received vertical frequency information.

If an image having a synchronizing frequency is received from the source device 200, the processor 160 may control to display the received image in a vertical frequency corresponding to the selected mode. Here, the processor 160 may adjust the vertical frequency within a vertical frequency range in a selected mode so as to enable the vertical frequency to accurately synchronize with a frame rate of the received image.

For example, if a frequency of an image to be output from the display apparatus 100 is 48 Hz, the user may select a first mode having a vertical frequency between 40 Hz and 50 Hz. Because the display apparatus 100 stores vertical frequency information of the selected first mode in DPCD and transmits the DPCD to the source device 200, and a frequency of a moving image is within a range of the first mode, the source device 200 may transmit the moving image as it is to the display apparatus 100. The display apparatus 100 may change a vertical frequency into a vertical frequency of 48 Hz in the first mode so as to enable the vertical frequency to synchronize with a frame rate of the received moving image.

If a frequency of a moving image to be output from the display apparatus 100 is 24 Hz, the frequency of the moving image is lower than the vertical frequency of the first mode. Therefore, the source device 200 may increase the frequency of the moving image to two times (e.g., 48 Hz) and then transmit the moving image to the display apparatus 100. If the moving image having the frequency changed into two times is received, the processor 160 may control to fix and output the frequency to 48 Hz in order to improve frequency waving of the received moving image.

Figure 2:
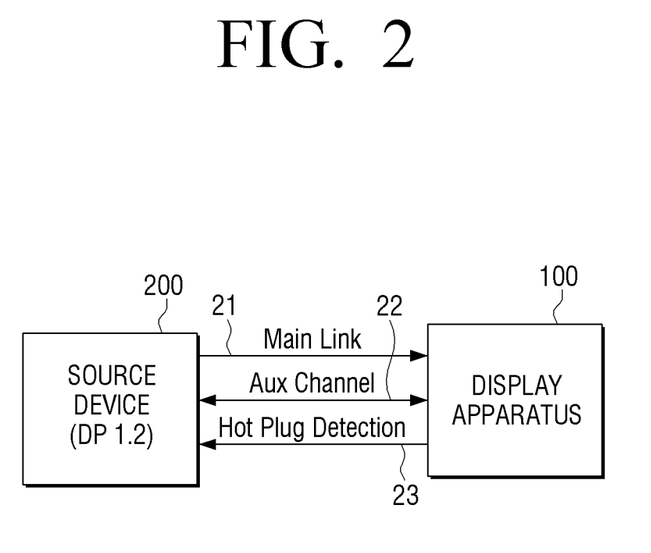
FIG. 2 is a block diagram illustrating a method of synchronizing frequencies between a display apparatus and a source device through an auxiliary channel, according to an exemplary embodiment.

FIG. 2 illustrates a method of synchronizing frequencies between a display apparatus and a source device through an auxiliary channel, according to an exemplary embodiment.

Referring to FIG. 2, a DP uses a main link 21, an auxiliary channel 22, and a HPD line 23 in order to transmit an image, a voice, and various types of data for driving the display apparatus 100. Here, the display apparatus 100 may be referred to as a sync apparatus.

The main link 21 is a main transmission channel of stream data, i.e., a one-way high-speed channel for isochronous stream transmission. The main link 21 may be used as 1, 2, or four lanes and is configured as a differential pair. The main link 21 may have a bit rate of 2.7 Gbps or 1.6 Gbps per lane. In order to provide an isochronous transmission service, the source device 200 may convert an image and a voice signal to be transmitted through the main link 21 into particular forms to reconfigure the image and the voice signal and transmit the image and the voice signal to the display apparatus 100.

The auxiliary channel 22 provides a link service to configure and maintain a main link. Also, the auxiliary channel 22 provides a service to check whether the display apparatus 100 is capable of normally displaying data transmitted from the source device 200.

The HPD line 23 is a signal line for notifying the source device 200 of a connection of the display apparatus 100. A HPDS notifies the source device 200 of an event such as an Interrupt Request (IRQ), Unplug, Plug/Re-Plug, or the like.

Here, the source device 200 is a master of an auxiliary channel, and the display apparatus 100 is a slave of the auxiliary channel. The source device 200 as the master may initialize a request signal, and the display apparatus 100 may send a response signal to the request signal. If the display apparatus 100 detects the HPDS, the source device 200 may designate the auxiliary channel 22 into an auxiliary standby state, and the display apparatus 100 is in a standby state.

A type of a link layer service of an auxiliary channel includes an auxiliary channel link service and an auxiliary channel device service. A policymaker or the like may be used to manage a link and devices between the source device 200 and the display apparatus 100.

An operation of an auxiliary channel starts by the HPDS, and the display apparatus 100 may check whether a mode of the display apparatus 100 is changed, by receiving the HPDS of a pulse train repeating logic "1" and "0". If it is checked that the mode of the display apparatus 100 is changed, the source device 200 may read the DPCD from the display apparatus 100 and acquire pieces of information about a link configuration, and a performance and a link state of the display apparatus 100 in order to initialize a stream transmission.

In other words, the source device 200 may read vertical frequency information included in the EDID from the display apparatus 100 and then, if the HPDS is received according to the change in the mode, read vertical frequency information included in the DPCD.

Here, the processor 160 may transmit the HPDS to the source device 200 by using a short pulse. According to appointed standards of a DP, the source device 200 may read EDID from the display apparatus 100 if the HPDS is transmitted by a long pulse but may perform an operation of reading merely DPCD if the HPDS is transmitted by the short pulse. Therefore, whenever a mode state is changed, the source device 200 may read merely the DPCD without reading each EDID, thereby improving a mute phenomenon.

After the main link 21 is configured, the source device 200 may read the DPCD whenever a HPD toggle occurs after a rising edge of HPD. The source device 200 may check whether a mode state of the display apparatus 100 is changed, by checking a user definition area of the DPCD through an auxiliary channel reading operation or the like within 100 ms after the rising edge of the HPD.

Figure 3:
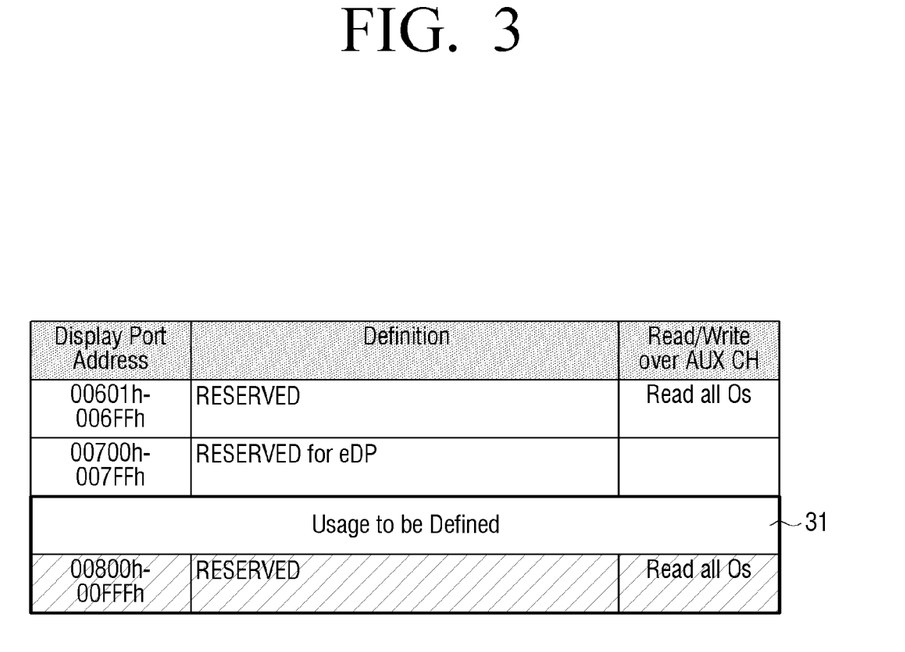
FIG. 3 illustrates vertical frequency information stored in DPCD, according to an exemplary embodiment.

FIG. 3 illustrates vertical frequency information stored in DPCD, according to an exemplary embodiment.

The DPCD may store various types of information and includes an area for storing information defined by a user. As shown in FIG. 3, a user definition area 31 of the DPCD may store information about a vertical frequency according to a mode selected by the user among vertical frequencies respectively depending on modes of the display apparatus 100. A vertical frequency value is changed into a vertical frequency range corresponding to a changed mode whenever a mode is changed and then stored in the DPCD.

For example, if an output frequency of a moving image that the user wants to view is checked as 48 Hz, the user may select a first mode having a vertical frequency range between 40 Hz and 50 Hz from an OSD menu. Here, a changed vertical frequency may be displayed as information about a supportable frequency on a display unit of the display apparatus 100.

If a mode is changed from a normal mode into a first mode, vertical frequency information about the selected first mode is stored in the user definition area 31 of the DPCD instead of vertical frequency information about the normal mode.

Figure 4:
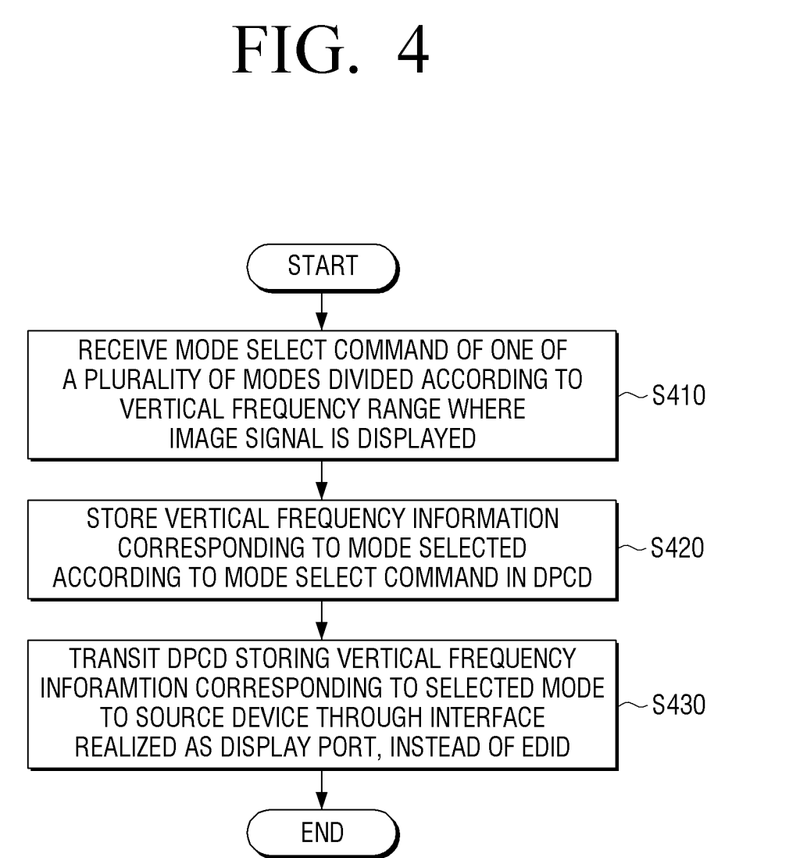
FIG. 4 is a flowchart of a method of controlling a display apparatus, according to an exemplary embodiment.

FIG. 4 is a flowchart of a method of controlling a display apparatus, according to an exemplary embodiment.

A user may check a frequency of an image (e.g., a game, a movie, or the like) that the user will view. In operation S410, the display apparatus 100 receives a mode select command of a mode corresponding to the checked frequency among a plurality of modes divided according to a vertical frequency range where an image signal is displayed, from the interface 120. Here, the display apparatus 100 may display an OSD menu on a screen and receive a mode select command of one mode of the displayed OSD menu.

In operation S420, the display apparatus 100 stores vertical frequency information corresponding to the mode selected according to the mode select command in DPCD.

In operation S430, the display apparatus 100 transmits the DPCD storing the vertical frequency information corresponding to the selected mode, instead of EDID including information about a vertical frequency where the display apparatus 100 operates, to a source device through an interface implemented as a DP. In detail, if a select command is input, the display apparatus 100 transmits a HPDS to the source device 200 and transmits the DPCD to the source device 200 through an auxiliary channel. Thereafter, the display apparatus 100 may receive an image having a frequency synchronizing with the vertical frequency information included in the transmitted DPCD from the source device 200 and display the image.

According to various exemplary embodiments as described above, EDID does not need to be produced with respect to each mode. Therefore, a code size of a display apparatus may be reduced, and a mute phenomenon problem may be improved.

A method of controlling a display apparatus according to the above-described various exemplary embodiments may be embodied as a program and then stored on various types of recording media. In other words, a computer program that is processed by various types of processors and thus is capable of executing the above-described various control methods may be stored and used on a recording medium.

For example, there may be provided a non-transitory computer readable medium that stores a program performing receiving a mode select command of one of a plurality of modes divided according to a vertical frequency range where an image signal is displayed, storing DPCD including vertical frequency information corresponding to the mode selected according to the mode select command, and transmitting the DPCD storing the vertical frequency information corresponding to the selected mode instead of EDID to a source device through an interface implemented as a DP.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display;
   a display port (DP) interface;
   a user input interface;
   a first memory configured to store Display Port Configuration Data (DPCD);
   a second memory configured to store Extended Display Identification Data (EDID) comprising first vertical frequency information regarding one of a plurality of modes, the plurality of modes being identified according to a vertical frequency range of an image signal; and
   a processor configured to:
      compare, in response to a command for selecting one of the plurality of modes being input through the user input interface, second vertical frequency information corresponding to the selected mode with the first vertical frequency information, and
      if the second vertical frequency information is not consistent with the first vertical frequency information, transmit the DPCD comprising second vertical frequency information to a source device through the DP interface.

2. The display apparatus of claim 1, wherein the DP interface comprises a main link, an auxiliary channel, and a Hot Plug Detect (HPD) line,
   wherein in response to the command, the processor is further configured to transmit a HPD signal for notifying that the command is input, to the source device through the HPD line and transmit the DPCD to the source device through the auxiliary channel.

3. The display apparatus of claim 1, wherein the processor is further configured to transmit the DPCD to the source device, receive the image signal having a frequency synchronized with the second vertical frequency information comprised in the transmitted DPCD from the source device, and display the image.

4. The display apparatus of claim 1, wherein the processor is further configured to display an On Screen Display (OSD) menu for a mode select command on the display, and in response to a mode select command of one mode being input through the OSD menu, store vertical frequency information corresponding to a mode selected according to the input mode select command in the DPCD.

5. The display apparatus of claim 2, wherein the processor is further configured to transmit the HPD signal by using a short pulse.

6. A method of controlling a display apparatus, the method comprising:
   receiving a command for selecting one of a plurality of modes, the plurality of modes being identified according to a vertical frequency range of an image signal;
   comparing first vertical frequency information included in Extended Display Identification Data (EDID) with second vertical frequency information corresponding to the selected mode; and
   if the second vertical frequency information is not consistent with the first vertical frequency information, transmitting a DPCD comprising the second vertical frequency information to a source device through a display port (DP) interface.

7. The method of claim 6, wherein the DP interface comprises a main link, an auxiliary channel, and a Hot Plug Detect (HPD) line, and
   wherein the transmitting comprises:
      transmitting a HPD signal for notifying that the command is input, to the source device; and
      transmitting the DPCD to the source device through the auxiliary channel.

8. The method of claim 6, further comprising:
   receiving the image signal having a frequency synchronized with the second vertical frequency information comprised in the transmitted DPCD from the source device; and
   displaying the image.

9. The method of claim 6, further comprising displaying an On Screen Display (OSD) menu for a mode select command and, in response to a mode select command of one mode being input through the OSD menu, storing vertical frequency information corresponding to a mode selected according to the input mode select command in the DPCD.

10. The method of claim 7, wherein the HPD signal is transmitted by using a short pulse.

11. A non-transitory computer readable recording medium having embodied thereon a program, which when executed by a processor of a display apparatus causes the display apparatus to execute a method of controlling the display apparatus, the method comprising:
- receiving a command for selecting one of a plurality of modes, the plurality of modes being identified according to a vertical frequency range of an image signal;
- comparing first vertical frequency information included in Extended Display Identification Data (EDID) with second vertical frequency information corresponding to the selected mode; and
- if the second vertical frequency information is not consistent with the first vertical frequency information, transmitting a DPCD comprising the second vertical frequency information to a source device through a display port (DP) interface.

\* \* \* \* \*